United States Patent [19]

Engdahl

[11] Patent Number: 4,694,304

[45] Date of Patent: Sep. 15, 1987

[54] EARTHQUAKE DISPLACEMENT RECORDER

[76] Inventor: Paul D. Engdahl, 2930-E Grace La., Costa Mesa, Calif. 92626

[21] Appl. No.: 896,090

[22] Filed: Aug. 13, 1986

[51] Int. Cl.$^4$ ............................................. G01D 9/00
[52] U.S. Cl. ...................................................... 346/7
[58] Field of Search ................ 73/784, 781, 786, 787, 73/841, 760, 856; 33/1 HH; 346/7, 33 C; 340/690, 689, 691

[56] References Cited

U.S. PATENT DOCUMENTS

| | | | |
|---|---|---|---|
| 3,331,078 | 7/1967 | Howland | 346/7 |
| 3,987,667 | 10/1976 | Rasmussen et al. | 73/784 |
| 4,155,265 | 5/1979 | Pickett et al. | 73/784 |

FOREIGN PATENT DOCUMENTS

| | | | |
|---|---|---|---|
| 11916 | of 1914 | United Kingdom | 340/690 |
| 683710 | 4/1964 | United Kingdom | 346/33 L |
| 1339272 | 11/1973 | United Kingdom | 73/786 |
| 1511691 | 5/1978 | United Kingdom | 340/690 |
| 0800605 | 1/1981 | U.S.S.R. | 73/786 |

Primary Examiner—Stewart J. Levy
Assistant Examiner—Robert R. Raevis
Attorney, Agent, or Firm—Lawrence Fleming

[57] ABSTRACT

A device for recording directly the strain or distortion of a structural space as caused by an earthquake. Two similar light, flat rigid A-frame-like members are attached to points near the floor and ceiling, e.g., of a room, with their apex portions facing each other and overlapping. A displacement recorder is mounted in the overlap region. Earthquake distortion or strain in buildings occurs commonly as relative lateral displacement between a floor and a ceiling; the A-frame members transmit such displacement directly to the recorder. The installation may lie flat against a wall and be enclosed by a shallow cover.

11 Claims, 14 Drawing Figures

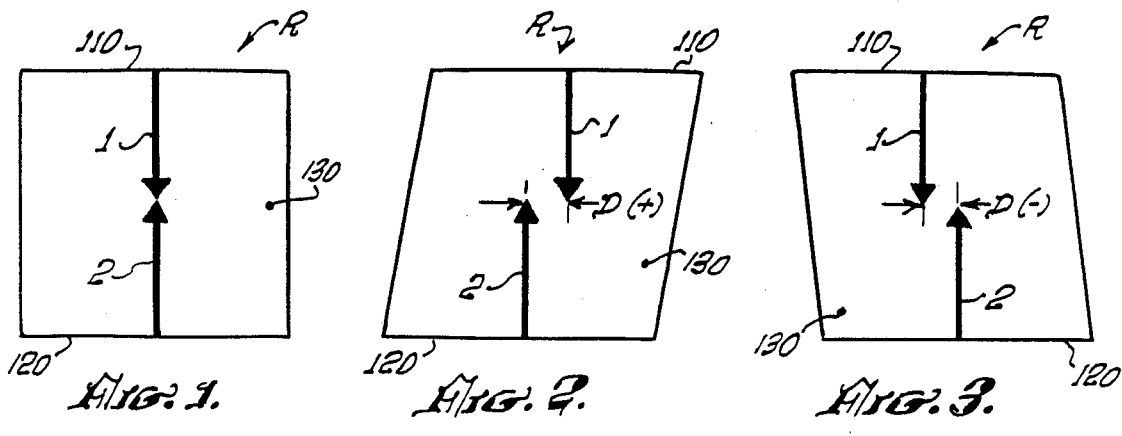
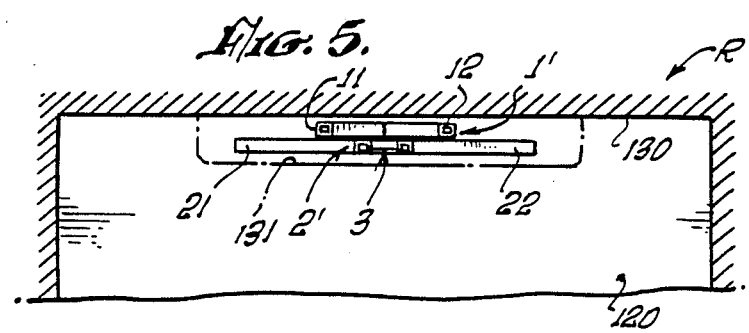
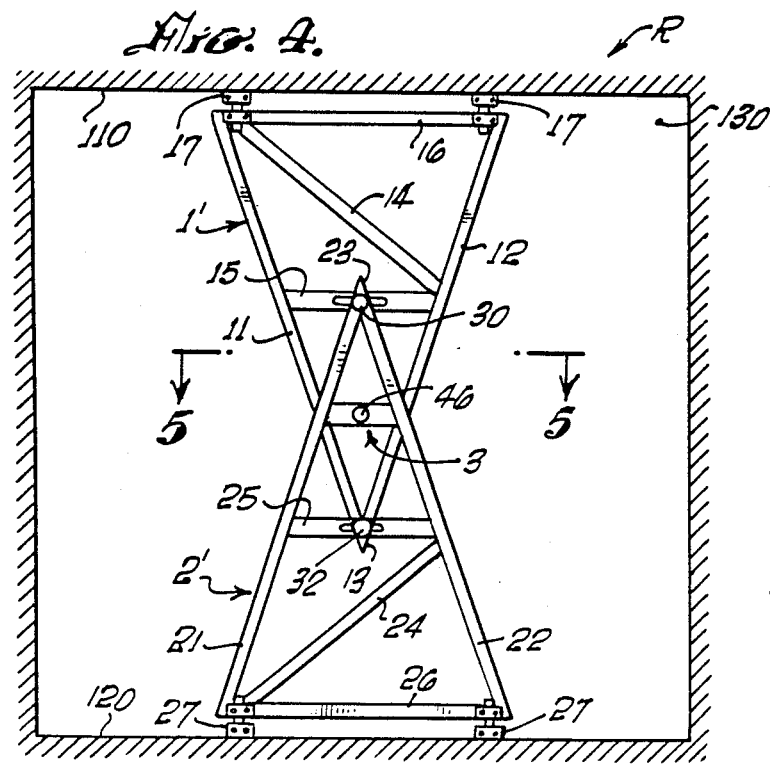
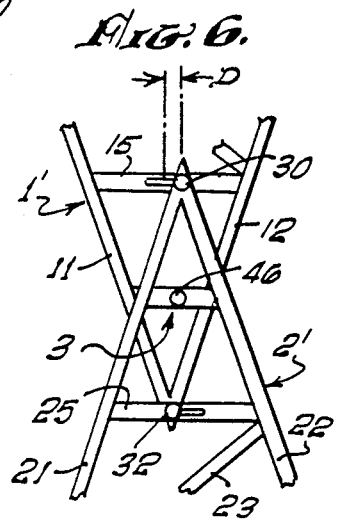

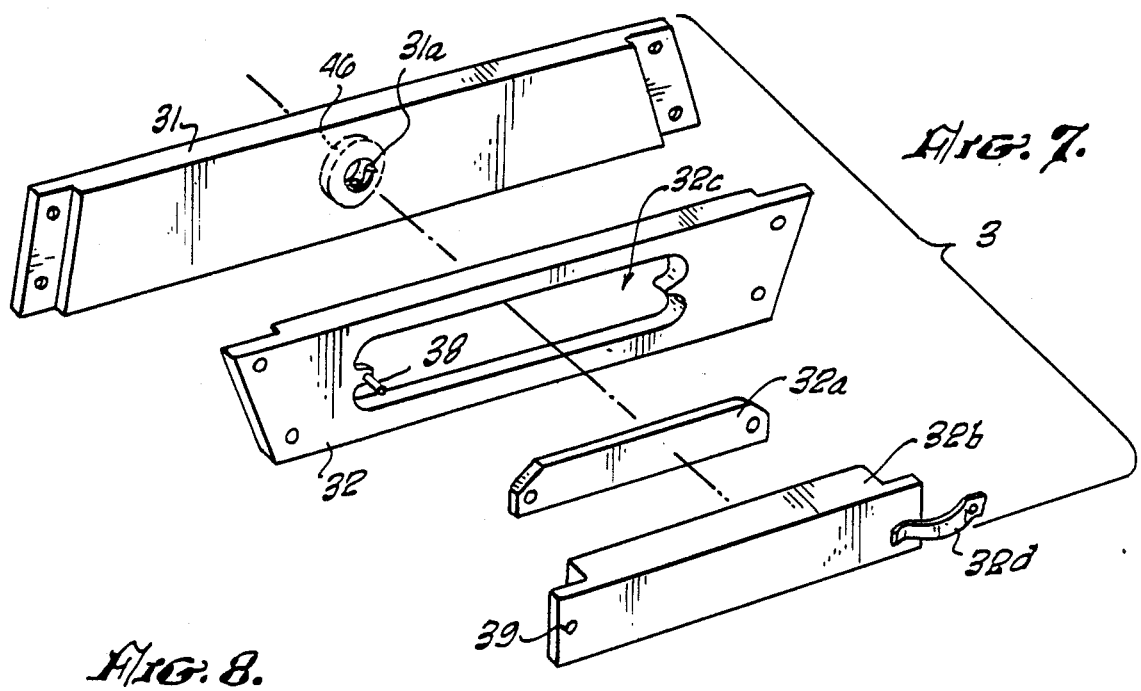
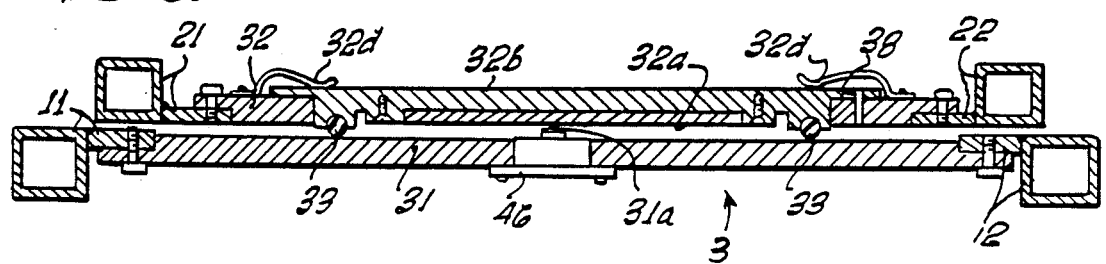
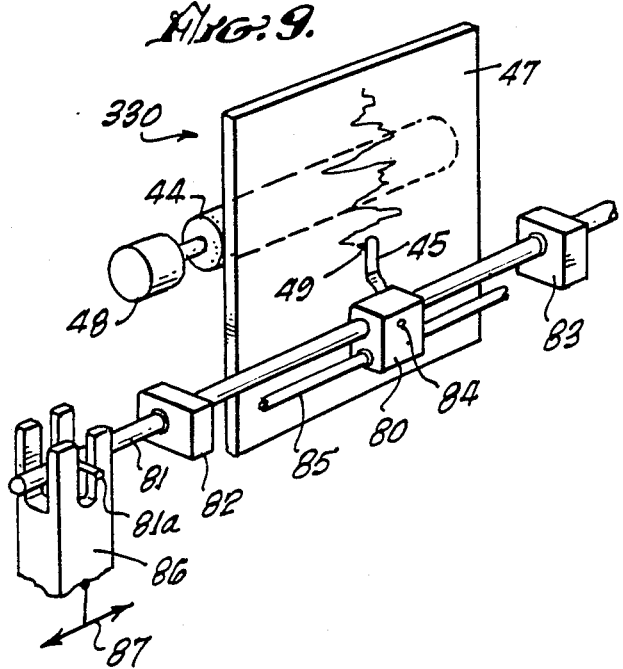
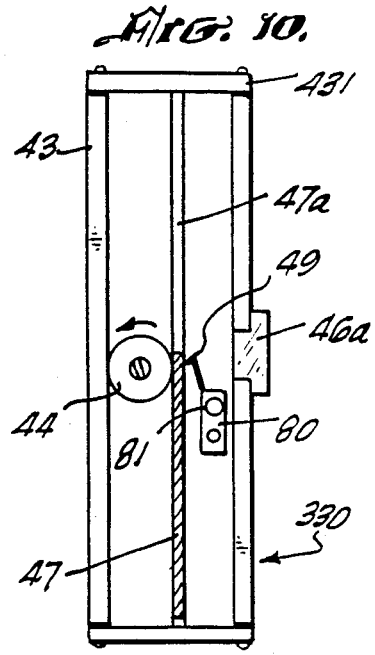

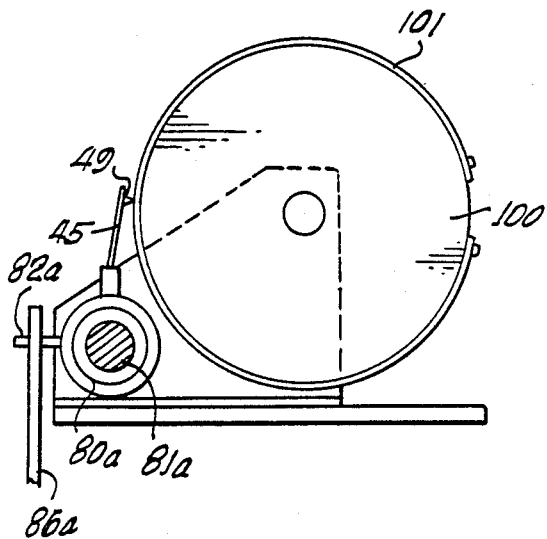
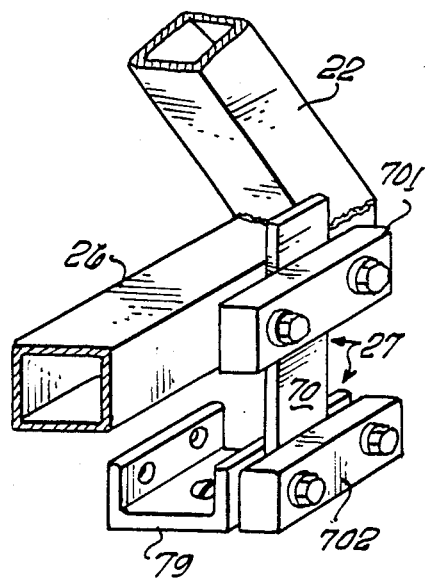
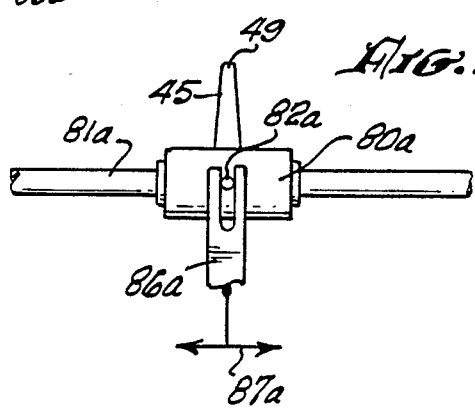
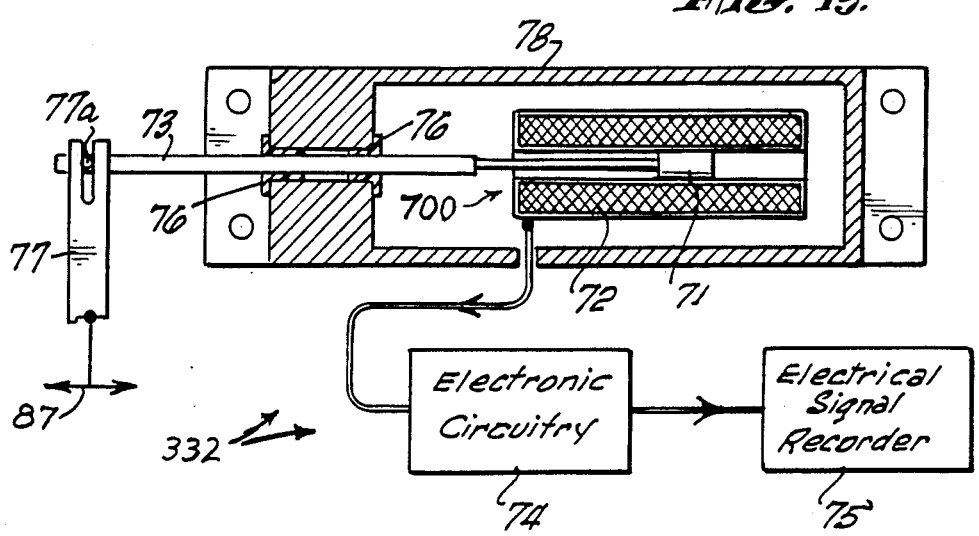

EARTHQUAKE DISPLACEMENT RECORDER

This is an instrument for recording the relative displacement in parallel planes of two different portions of a structure, such as the floor and ceiling of a room, as caused by an earthquake or other large disturbance. Such displacements may be considered as strain in shear. Such records are useful in structural engineering and in the evaluation of the safety of structures which have been subjected to earthquakes or the like. In prior practice, relative displacement data are obtained by double integration of accelerograph records, a relatively cumbersome process.

Some prior accelerographs are shown, for example, in my U.S. patent application Ser. No. 758,307, filed July 24, 1985, and in my prior U.S. Pat. Nos. 3,683,397; 3,740,757; 3,795,006; 3,974,504; and 4,223,309. My copending application Ser. No. 847,661, filed Apr. 3, 1986 shows an instrument for recording directly the relative displacements between the base and the foundation of a base-isolated structure.

The instrument of the present invention is suited primarily to recording shear-like relative horizontal displacements between the floor and ceiling of a room. Its main elements are two light, rigid, flat, displacement-transmitting members, preferably shaped as A-frames, which transmit the displacements to a suitable recording means. The base of one A-frame member is attached to or near the floor, its apex extending upward. The second, similar A-frame member is mounted upside down with its base attached to or near the ceiling with its apex extending downward. The apices of the two members overlap. The members are disposed in parallel planes and touch each other, being held together with sliding joints. A recording device is mounted in the middle portion of this assembly.

The preferred type of recorder is the scratch type, wherein a hard stylus records a track or trace on a metallic record plate having a specially coated or plated surface. Recorders of this kind are shown, for example, in my prior U.S. patents referred to above. A recorder of this type using a stationary record plate, may be made in two halves with generally flat surfaces facing each other. One of the halves may contain the stylus assembly and be attached to the outermost A-frame member, and the other half may contain the record plate and be attached to the other A-frame. The two halves are disposed to slide over each other in response to displacement of the A-frames; the space between them may be sealed with a lubricated gasket, such as an O-ring.

Alternative recorders may use a moving flat record plate, a drum or record roll, or an electrical recording system.

The A-frame members described above may each be about 7 cm thick and mounted near or on a wall. The assembly thus occupies relative little floor space and may be enclosed by a protective cover after the manner of ventilating ducts and wiring raceways.

IN THE DRAWING

FIGS. 1-3 are diagrams illustrating the principle of the invention;

FIG. 4 is a front elevation view of a complete instrument of the invention;

FIG. 5 is a section on line 5—5 of FIG. 4;

FIG. 6 is a detail of FIG. 4 with the A-frame members shown displaced;

FIG. 7 is an exploded perspective back view of a scratch-type displacement recorder;

FIG. 8 is a vertical sectional view of the recorder of FIG. 7;

FIG. 9 is a diagrammatic view of another type of recorder having a moving flat record plate;

FIG. 10 is a sectional view of the recorder of FIG. 9;

FIG. 11 is an end view of a modified recorder having a record drum;

FIG. 12 is a partial rear view of the recorder of FIG. 11;

FIG. 13 is a diagram of an alternative recording system; and

FIG. 14 is an isometric view of one of the mounting connectors of FIG. 4.

DETAILED DESCRIPTION

FIGS. 1-3 illustrate diagrammatically the principle of the invention. In FIG. 1, a room or other space in a structure is indicated at R, with a ceiling 110 and a floor 120. A wall 130 is disposed parallel to the plane of the paper. A rigid pointer-like member is indicated diagrammatically by arrow 1, attached at its base to the ceiling 110. A similar member 2 is attached to the floor. The members' tip portions lie opposite each other when the room structure R is not strained.

FIG. 2 illustrates a condition of strain or distortion encountered during an earthquake, where floor 120 and ceiling 110 remain about parallel, but are displaced oppositely in their respective planes. The magnitude of the strain may be measured by the distance D between the tips of pointer members 1 and 2.

FIG. 3 shows the same condition of structural strain, but in the opposite direction. Some vertical displacement usually occurs together with the lateral displacement, but in a lesser degree.

It is desirable to provide an instrument which may be installed in structures to record such lateral or shear displacements directly, rather than by double integration of acceleration data; and the principle of FIGS. 1-3 may be used to provide such an instrument. A practical embodiment is shown in FIGS. 4-6.

FIG. 4 is an elevation or front view of such an instrument installed in a room or like structural space R. The pointer-like members of FIGS. 1-3 are embodied here as light, stiff A-frame members 1', 2'. The upper A-frame member 1' has a base element or rail 16 attached to or adjacent the ceiling 110 by mounting connectors at 17, 17. Member 1' further comprises side elements or rails 11, 12 which meet at an apex 13; a slotted cross-rail 15; and a diagonal brace element or stiffener 14. The lower A-frame member 2' is made similarly, with base element 26 attached to or adjacent the floor 120 by connectors 27, 27; side rails 21, 22; a slotted cross-rail 25; a brace or stiffener 24; and apex 23. Both A-frames 1' and 2' may be conveniently made of pieces of square aluminum tubing welded together, or of aluminum channel about 4×8 cm in section.

The A-frame members 1', 2' are preferably installed near a wall 130, as best shown in the top sectional view of FIG. 5. Their base or input portions are at the mechanical connections to the structure 17, 27. The portions near the apices 13, 23 may be considered "output". The members overlap each other, FIGS. 4-5. The installed pair is typically less than about 20 cm deep, and so may be covered with a suitable shallow cover, indicated at 131, which extends from floor to ceiling and takes up but little floor space.

Referring again to FIG. 4, the A-frame members 1', 2' overlap so that the apex portion of each one lies against the slotted cross-member at a middle portion of the other, as at 13 and 23, and is held against it to form a sliding joint. Thus, a suitable pin means 30 holds apex 23 with light pressure against slotted cross-rail 15, extending through a hole in apex 23 and through the slot in cross-rail 15. When the A-frame members are displaced horizontally by a strain in the structure, the pin means 30 will slide along in the slot. A similar sliding joint is provided at the other apex 13 with slotted cross-member 25 via pin means 32. The pin means 30, 32 may be made up of ordinary bolts and spring washers and like components. It will be apparent that these two sliding joints constrain the two A-frame members 1' and 2' to lie in parallel planes and permit them to move horizontally with respect to each other. They also permit some vertical motion. Suitable limits are about 8 cm horizontal and 1.5 cm vertical.

FIG. 6 illustrates the middle portion of A-frame member assembly 1', 2' in a condition of strain or displacement. The displacement D in FIG. 6 corresponds to the displacement D in FIG. 3. It will be noted that the pin means 30, 32 are near the ends of their respective slots.

The construction of the mechanical mounting connectors 17, 27 of FIG. 3 is shown more completely in FIG. 14. Each connector is made adjustable in height and somewhat flexible in bending to accommodate irregularities in the structure to which it is mounted and to accomodate deflection perpendicular to wall 130. The A-frame member is supported by a heavy, but flexible, tongue or strip 70 of sheet metal which is clamped to the A-frame base member 26 at 701 and to a support element 79 at 702, by conventional means. By loosening clamp bolts at 701, the height may be adjusted. Support element 79 may conveniently be a short section of metal channel stock with holes for bolting it to the floor, or, in the case of connectors 17, to the ceiling; or to points on the wall 130 near the floor and ceiling.

The actual device which records the displacement, such as D, FIG. 6, is preferably mounted about in the middle of the overlap area between displacement-transmitting or A-frame members 1' and 2', and is indicated generally at 3 in FIGS. 4–6. Various types of recorders may be used.

FIG. 7 is an exploded view of a simple form of "scratch" recorder suitable for this purpose. It comprises a stylus carrier portion 31 and a record carrier portion 32. The latter is mounted to the rearmost A-frame member 1' (which lies nearest the wall 130 in FIGS. 4–5), and the stylus carrier portion 31 to the front or outermost member 2'. The stylus 31a is mounted on a transparent stylus holder or carrier 46 made, e.g., of polycarbonate resin, through which the record may be inspected.

The two plate-like parts or portions 31, 32 are disposed so as to slide against each other, separated only by a lubricated gasket, shown as an O-ring 33 (FIG. 8). Referring again to FIG. 7, a suitable spring-loaded stylus 31a faces the record plate holder portion 32. This last has an opening 32c into which a record plate holder 32b, with a record plate 32a attached, is inserted. The groove for O-ring 33 is in holder 32b and surrounds the record plate 32a. The sectional view of FIG. 8 shows the relation of these parts assembled. Stylus 31a is mounted in the removable transparent stylus carrier 46 and bears on record plate 32a. The space between stylus carrier plate or portion 31 and record carrier plate 32 is sealed by O-ring 33; only the holder 32b is grooved. The outer portion of O-ring 33 bears on a flat surface to permit relative sliding of plates 31, 32. It will be seen that when an earthquake or other disturbance makes A-frame members (displacement-transmitting members) 1', 2' move laterally with respect to each other, the carrier 31 will move similarly with respect to carrier 32, and so the stylus 31a will mark a trace on record plate 32a.

Record plate holder 32b is slidable inward and outward in the opening 32c (FIG. 8). It is preferably urged inward by suitable spring means, such as flat springs 32d, to keep the O-ring 33 in contact with the surface of element 31.

Keying means 38, 39 are shown in FIGS. 7 and 8, to keep holder 32b from being inserted upside down and to positively locate it. While shown as a single locating pin 38 and hole 39, the means may take any convenient form.

FIGS. 9–10 show semi-diagrammatically a modified scratch recorder having a moving flat record plate, and indicated generally as 330. Record plate 47, guided in grooves 47a in the sides of case 43, is moved by suitable motor means and roller-like means 48, 44 to provide a time base. Stylus 49 on spring arm 45 is mounted to a suitable stylus carrier 80 constrained to linear movement. A suitable guide and driving mechanism comprises a rod 81 slidable in bushings 82, 83, to which carrier 80 is fixed as by a pin at 84. Rod 85 is a guide rod. Externally of the case 43 (FIG. 10), a pin 81a on the end portion of driving rod 81 engages suitable slots in a driving yoke 86. Displacement of yoke 86 in the direction of rod 81, as indicated by arrows 87, will move the stylus 49. Vertical displacement of the yoke with respect to case 43 may occur during an earthquake; this is taken up by the pin 81a sliding in the slot and will not appear on the record.

The recorder 330, FIGS. 9–10, in its case 43 is preferably mounted on the lower (front) A-frame member 2' (FIG. 4). Yoke 86, FIG. 9, is preferably connected by suitable members, not shown, to the other A-frame member 1'.

In the section view of FIG. 10, element 431 is a removable cover in case 43, and element 46a is an inspection window.

FIG. 11 is a simplified side view of another form of recording means, a drum recorder with record drum 100 supporting a suitable film or sheet-like record medium 101. Stylus 49 on spring means 45 is disposed to record thereon. The stylus assembly is mounted on a stylus carrier 80a which is slidable along a stationary rod or other suitable linear guide means 81a. A pin 82a in carrier 80a may engage a slot in a yoke 86a, FIG. 12. A suitable case, not shown, may be provided.

As in the modification of FIGS. 9–10, the recorder of FIGS. 11–12 is preferably mounted on the lower (front) A-frame member 2' (FIG. 4) by suitable means, and the yoke 86a connected by suitable means (not shown) to the other A-frame member 1'. Displacements, such as indicated at D, FIG. 6, will displace the stylus 49, FIGS. 11–12, with respect to its record drum 100, as indicated by arrows 87. The yoke linkage 82a, 86a accommodates vertical displacements in the same manner as the yoke linkage 81a, 86 of FIG. 9.

FIG. 13 shows diagrammatically a modified recording means 332. Here, a mechanoelectric displacement transducer 700 is mounted in a case 78 and actuated from outside the case by a rod 73 which may slide in bushings 76, 76. Rod 73 terminates in a pin-and-yoke linkage 77, 77a which transmits lateral displacements and absorbs vertical displacements in the same manner as the yoke linkages of FIGS. 9–12. Case 78 is preferably mounted to one A-frame member, such as 2' (FIG. 4), and the yoke 77 connected by means, not shown, to the other A-frame member, such as 1'.

Displacement of yoke 77 in the direction of arrows 87, FIG. 13, will be translated into an analogous electrical signal by transducer 700. A suitable type of transducer is a linear variable differential transformer having stationary windings 72 (attached to case 78) and a ferromagnetic core 71 slidable therein. Other types of transducers, such as potentiometers, may be used instead. The analog output signal may then be processed by suitable external circuitry 74 and recorded on an electrical signal recorder at 75.

In this specification, the term "connection" means a mechanical connection.

I claim:

1. An instrument for recording generally lateral shear-like vibrational displacements between a first and a second structural portion of a structure, said displacements being generally perpendicular to a line joining said structural portions, comprising:

a first and a second generally flat triangular displacement-transmitting member, each having a base portion and an apex portion;

said members being disposed in adjacent parallel planes with their base portions spaced and parallel and facing outward, and their apex portions facing inward and overlapping each other to define an overlap area;

sliding joint means in said overlap area disposed to hold said members together but to permit relative sliding displacement in their own planes along a direction parallel to said base portions;

mounting means to fasten each said base portion to a separate one of said structural portions, and a displacement recording device disposed in said overlap area to record said relative displacement, said displacement corresponding to said lateral shear-like displacement;

said structural portions being at least about a meter apart.

2. An instrument as in claim 1 wherein:

said structure is a room-like portion of a building, and said structural portions are portions of said building's floor and ceiling near a wall, said instrument being adapted to be installed generally against said wall.

3. An instrument as in claim 1 wherein each said displacement-transmitting member is in the form of an A-frame made of elongated parts, and has a cross-member portion in said overlap area.

4. An instrument as in claim 3 wherein:

said sliding joint means comprises a slot in each said cross-member portion and pin means connected to the apex portions of each said displacement-transmitting members and extending through a said slots to hold said displacement-transmitting members loosely and slidably together, said sliding joint means accommodating several centimeters of lateral displacement and a lesser amount of vertical displacement.

5. An instrument as in claim 4 wherein:

said recording device comprises a case, a record medium, and means to guide and move said medium to provide a time base;

a stylus carrier with a stylus adapted to mark said record medium;

linear guide and support means for said stylus carrier and a drive rod connected to said carrier and having an external portion extending outside said case, linear motion of said rod moving said stylus accordingly;

a rigid connection from said case to one said displacement-transmitting member; and a yoke linkage from said external portion of said rod to the other said displacement-transmitting member, said yoke linkage transmitting linear horizontal displacement to said rod, but absorbing vertical displacement.

6. An instrument as in claim 5 wherein:

said record medium is a flat record plate adapted to be moved linearly.

7. An instrument as in claim 5 wherein:

said record medium is in the shape of a drum adapted to be rotated.

8. An instrument as in claim 3 wherein:

said displacement recording device comprises a stylus carrier portion having a stylus and a record carrier portion containing a fixed record plate markable by said stylus, said carrier portions having flat surfaces facing each other;

a connection from one said carrier portion to said first member and a connection from the other said carrier portion to said second member; and slidable gasket means between said surfaces of said carrier portions disposed to seal the space therebetween surrounding said stylus and record plate.

9. An instrument as in claim 8 wherein:

said gasket means is an elastomeric O-ring seated in a grove in said record carrier portion, the opposing surface on said stylus carrier portion being flat and slidable against said O-ring.

10. An instrument as in claim 8 wherein:

said stylus is mounted in a transparent stylus holder, the presence of a record trace being visible therethrough.

11. An instrument as in claim 1 wherein:

said recording device comprises a case, a mechanoelectric displacement transducer mounted therein having a transducer actuating element or rod having an external portion extending outside said case;

rigid mechanical connection means from said case to one said displacement-transmitting member; and a yoke linkage from said external portion of said actuating element ar rod to the other said member, said linkage transmitting lateral linear motion to said transducer, but absorbing vertical motion; and electrical signal-processing and recording means connected in operative relation to said transducer.

* * * * *